UNITED STATES PATENT OFFICE.

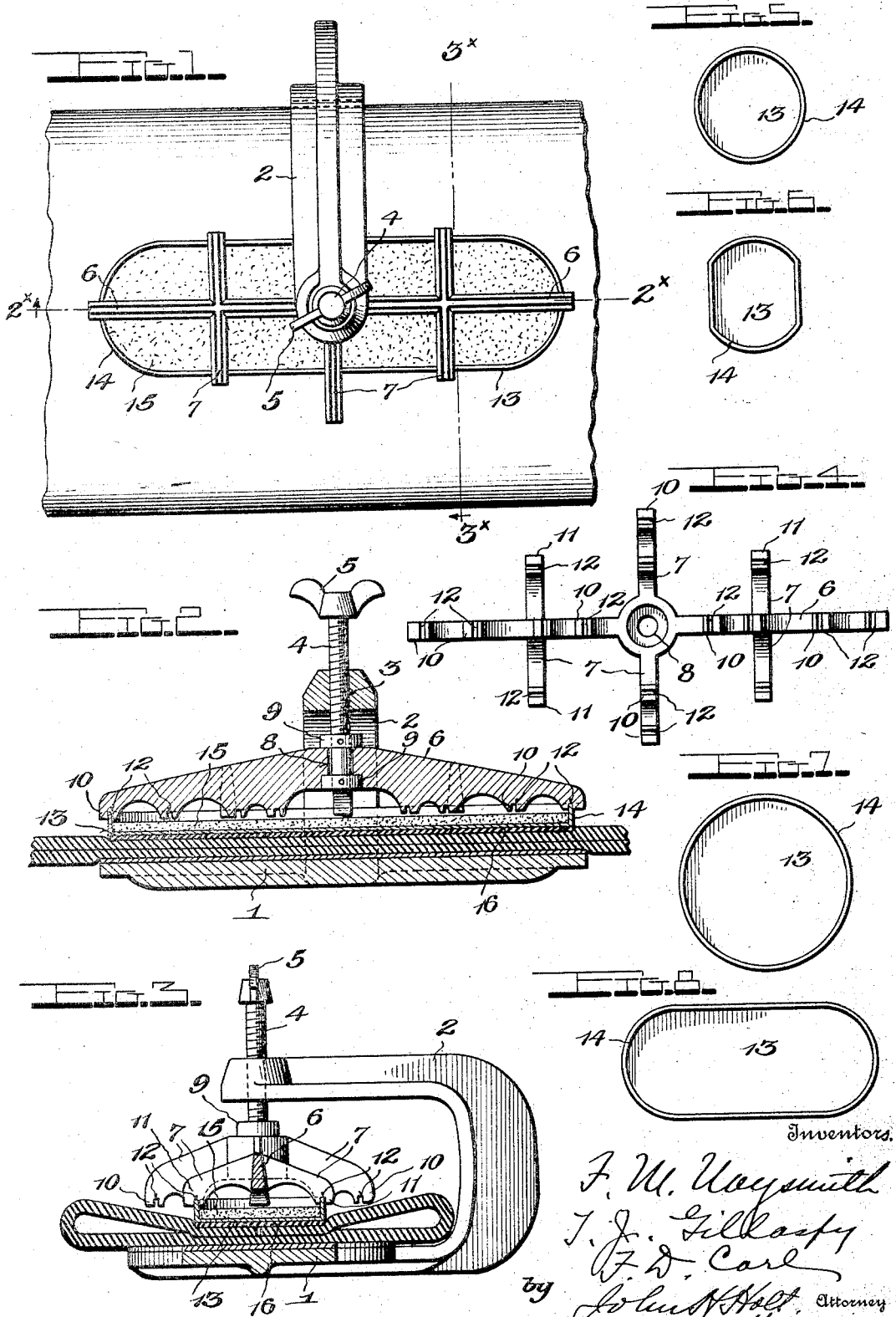

FRANK M. NAYSMITH, THOMAS J. GILLASPY, AND FORREST D. CARL, OF DAVENPORT, IOWA, ASSIGNORS, BY DIRECT AND MESNE ASSIGNMENTS, OF ONE-HALF TO SAID THOMAS J. GILLASPY AND ONE-HALF TO A. D. BROWNLIE, BOTH OF DAVENPORT, IOWA.

VULCANIZING DEVICE.

1,225,845.

Specification of Letters Patent.

Patented May 15, 1917.

Application filed May 22, 1916. Serial No. 99,099.

*To all whom it may concern:*

Be it known that we, FRANK M. NAYSMITH, THOMAS J. GILLASPY, and FORREST D. CARL, citizens of the United States, residing at Davenport, in the county of Scott and State of Iowa, have invented certain new and useful Improvements in Vulcanizing Devices, of which the following is a specification.

The primary object of this invention is to provide a device for vulcanizing patches to rubber tubing, sheeting and the like, having holes or punctures therein.

The invention comprises means for holding the article to be treated and for pressing a pan or holder containing a vulcanizing substance on the patch and article during the vulcanizing operation, the said means being so constructed that various sizes of pans or holders may be employed and engaged thereby, according to the size of the patch to be applied, for exerting a pressure equally throughout the length and width of the pan or holder.

In order to more fully describe the said invention, reference will be had to the accompanying drawings wherein:—

Figure 1, shows in top plan the invention for applying a patch to rubber tubing;

Fig. 2 a longitudinal vertical section on the line 2×—2× of Fig. 1;

Fig. 3 a vertical section on the line 3×—3× of Fig. 1;

Fig. 4 a bottom plan of the crab for engaging and holding the pan on the patch and article during the vulcanizing operation; and Figs. 5, 6, 7, and 8, in top plan various sizes of pans which may be employed.

The improved vulcanizing device comprises in the case shown, among other parts, an elongated base 1, and integrally connected thereto at its center and along one edge is an over-hanging arm 2. The arm is provided at its upper or free end with a screw-threaded opening 3 for the reception of a screw-threaded shaft 4 having wings 5 thereon for rotating the same.

A crab consisting of a longitudinal bar 6 and a plurality of arms 7, extending at right angles to the bar, is supported by the shaft 4, the shaft passing through an opening 8 formed in the longitudinal bar 6. Collars 9 are fastened to the shaft, and are located on each side of the bar 6 for connecting the crab to the shaft.

The bar 6 and the central arms 7 are provided with a plurality of downwardly extending feet 10, and the outermost arms 7 are each shown provided with a single foot 11, the feet 10 and 11 of the bar 6 and arms 7 being provided with notches or grooves 12.

A pan 13 having an upstanding rim 14 is adapted to receive a combustible substance 15, such as pasteboard, or a composition of pasteboard, ground peat, saw-dust and charcoal, saturated with a solution of saccharin, gum-arabic, water, granulated sugar, sulfur and salt-peter, the substance being pressed into sheets, and of any size or thickness to fit the pans. It is of course understood that it is not the intention to be limited in the use of this invention to this specific combustible substance as others might be employed.

When a tire, rubber tube, or sheet of rubber is to be treated for applying a patch to a hole or puncture therein, it is placed upon the base 1 with a patch of rubber 16 over the hole or opening, the patch being made of a size to cover the hole or opening, and then a pan of the size of the patch is placed over the patch. The crab is now lowered and the grooves 12 in the feet 10 and 11 will receive the rim 14 of the pan 13 therein, the crab continuing its downward movement until the proper pressure is applied to the patch and tire or sheeting for the vulcanizing operation, and when everything is in readiness, the combustible substance 15 is ignited which will produce an intense heat, burning slowly without blazing, for a sufficient period to perfectly perform the vulcanizing function.

Upon the completion of the operation the shaft 4 is turned and the crab disengaged from the pan, when the pan and article can be removed.

The grooves 12 of the feet 10 and 11 of the arms 7 are arranged in parallel rows, and the feet 10 and grooves 12 of the bar 6 are arranged with respect to the feet and grooves of the arms 7, so that various sizes and shapes of pans or holders may be employed and engaged by the feet of the bar and arms for the vulcanizing operation. For instance, the innermost grooves of the bar 6 and the central arms 7 are adapted to receive the rim 14 of a circular pan 13, such as is shown in Fig. 5, or a pan 13 constructed as shown in Fig. 6; while the grooves at the outer ends of the central arms 7, and the grooves of the bar 6 located adjacent to the inner ends of the outermost arms 7, are adapted to receive the rim 14 of the pan 13, shown in Fig. 7; and the grooves of the outermost arms 7 are adapted to receive the rim 14 of the pan 13 shown in Fig. 8.

If the patch to be applied is of greater size than any of the pans at hand or which can be engaged by the crab, the vulcanizing operation is performed repeatedly, by moving the vulcanizing device along the article the proper distance after each operation until the entire patch has been applied.

Without limiting our invention to the specific construction herein shown and described, what we claim is:

1. A vulcanizing device, comprising in combination with a heating member, a clamp having a base and a crab movably supported with relation thereto and adapted to exert pressure upon said heating member, said crab having retaining means located at various distances from a central point for engaging various sizes of heating members.

2. A vulcanizing device, comprising in combination with a heating pan, a clamp having a base and a crab movably supported with relation thereto and adapted to exert pressure upon said pan, said crab having a plurality of feet provided with pan retaining means located at various distances from a central point for engaging various sizes of pans.

3. A vulcanizing device, comprising a clamp having a base and a crab movably mounted with respect thereto and consisting of a longitudinal bar, and arms extending outwardly from said bar, said bar and arms being provided with pan retaining means located at various distances from a central point to engage various sizes of pans for holding them on the base during the vulcanizing operation.

4. A vulcanizing device, comprising a base and an overhanging arm, a crab adjustably mounted on said arm, and having a plurality of pan engaging feet located at various distances from a central point to accommodate various sizes and shapes of pans.

5. A vulcanizing device, comprising a clamp having a base and a crab movably supported with respect thereto, said crab consisting of a bar and a plurality of arms extending outwardly from the bar, said bar and arms having pan engaging feet with grooves therein located at various distances from a central point for engaging various sizes of vulcanizing pans.

6. A vulcanizing device comprising a clamp having a pan holding crab provided with a set of members radiating from a common center and another set of members extending outwardly from certain of said first mentioned members, pan retaining means on each of said members, the said first mentioned set of members being provided each with a plurality of such retaining means located at different distances from said common center to accommodate various sizes of pans.

In testimony whereof we have affixed our signatures in the presence of two witnesses.

FRANK M. NAYSMITH.
THOMAS J. GILLASPY.
FORREST D. CARL.

Witnesses:
EDNA F. GOOS,
REALFF OTTESEN.

Copies of this patent may be obtained for five cents each, by addressing the "Commissioner of Patents, Washington, D. C."